United States Patent
Moberg et al.

(10) Patent No.: US 6,578,084 B1
(45) Date of Patent: Jun. 10, 2003

(54) PACKET PROCESSING USING ENCAPSULATION AND DECAPSULATION CHAINS

(75) Inventors: Kenneth A. Moberg, Boulder Creek, CA (US); Claude A. Cartee, Los Altos, CA (US); Gregory D. Stovall, San Mateo, CA (US); David R. Hampton, Mill Valley, CA (US); Kirk Stewart Lougheed, Atherton, CA (US); Pedro Marques, San Jose, CA (US); Timothy D. Kolar, Campbell, CA (US); Andrew J. Valencia, Vashon, WA (US); William B. May, Jr., Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/419,035

(22) Filed: Oct. 15, 1999

(51) Int. Cl.[7] .............................................. G06F 15/16
(52) U.S. Cl. ..................... 709/236; 709/246; 709/250; 370/466; 370/469; 370/389; 370/41; 370/395.52; 370/395.6
(58) Field of Search ................................ 709/238–239, 709/231, 236, 246, 250; 370/466–469, 255–256, 389, 395.52, 401, 395.6, 409

(56) References Cited

U.S. PATENT DOCUMENTS

| | | |
|---|---|---|
| 5,267,239 A | 11/1993 | Pospischil et al. |
| 5,745,758 A | 4/1998 | Shaw et al. |
| 5,764,920 A | 6/1998 | Cook et al. ............. 395/200.68 |

(List continued on next page.)

OTHER PUBLICATIONS

Craig Partridge "A 50–Gbs IP router", IEEE/ACU Transaction 1998, p. 237–248.*

Morris, Robert, et al., "The Click Modular Router," 17th ACM Symposium on Operating Systems Principles (SOSP '99) Published as *Operating Systems Review* 34(5): 217–231, Dec. 1999.

(List continued on next page.)

*Primary Examiner*—Glenton B. Burgess
*Assistant Examiner*—Hieu Le
(74) *Attorney, Agent, or Firm*—Hamilton, Brook, Smith & Reynolds, P.C.

(57) ABSTRACT

A method for processing packets in a router includes specifying operations on packets as chains of processing elements. Each chain is uniquely associated with one interface/protocol pair, and each processing element performs at least one function on a packet. An incoming packet is received, and processed, first by a demultiplexor element which determines the protocol of the next higher level used by the packet. Then, the packet is processed by the elements of a decapsulation chain associated with the interface on which the packet was received, and by the elements of an encapsulation chain associated with the interface on which the packet is to be transmitted. The demultiplexor element or operation passes the packet on to a decapsulation chain associated with the protocol and with the incoming interface, depending on protocol information contained in the incoming packet. Decapsulation and encapsulation chains can be built dynamically, by inserting new and removing old elements as necessary as new protocols are developed and new features added. A chain walker walks through the chains, passing the processed packet to each element in a chain, until either the end of the chain is reached and processing is complete, or until the packet is dropped because no function can process it, or because a packet is processed by an outside process or by hardware, which may optionally stop the chain walk. A chain walk may be temporarily halted, or may be terminated. If temporarily halted, the chain walk can be resumed at any element in the chain, depending on the packet's requirements. A chain walk can also begin at any element in a chain.

32 Claims, 10 Drawing Sheets

U.S. PATENT DOCUMENTS

| | | | |
|---|---|---|---|
| 5,867,666 A | * 2/1999 | Harvey | 709/238 |
| 5,982,783 A | * 11/1999 | Frey et al. | 370/467 |
| 5,983,269 A | 11/1999 | Mattson et al. | 709/221 |
| 6,092,110 A | 7/2000 | Maria et al. | 709/225 |
| 6,160,811 A | 12/2000 | Partridge et al. | 370/401 |
| 6,219,706 B1 | 4/2001 | Fan et al. | 709/225 |
| 6,236,660 B1 | 5/2001 | Heuer | |
| 6,240,084 B1 | 5/2001 | Oran et al. | 370/352 |
| 6,320,848 B1 | * 11/2001 | Edwards et al. | 370/255 |
| 6,226,267 B1 | * 5/2002 | Pinney et al. | 370/235 |
| 6,385,194 B2 | 5/2002 | Surprenant et al. | 370/353 |

OTHER PUBLICATIONS

Kohler, Eddie, et al., "The Click Modular Router," available at http://www.pdocs.lcs.mit.edu/papers/click.tocs00. To appear in *ACM Transactions on Computer Systems*, Aug., 2000.

* cited by examiner

PACKET PROCESSING USING ENCAPSULATION AND DECAPSULATION CHAINS

RELATED APPLICATIONS

This application discloses subject matter that is related to subject matter disclosed in the following applications, assigned to Cisco Systems, Inc., the assignee of the present invention, and are incorporated herein by reference:

Kenneth Moberg and Manoi Leelanivas, PACKET PROCESSING USING NON-SEQUENTIAL ENCAPSULATION AND DECAPSULATION CHAINS, filed on the even day herewith, Ser. No. 09/418,781.

Kenneth Moberg, Kristen Marie Robins, and William May, DISTRIBUTED PACKET PROCESSING USING ENCAPSULATION AND DECAPSULATION, filed on the even day herewith, Ser No. 09/418,723.

BACKGROUND OF THE INVENTION

A network is a communication system that allows a user on a computer to access resources and exchange messages with users on other computers. A network is typically a data communication system that links two or more computers and peripheral devices. It allows users to share resources on their own systems with other network users and to access information on centrally located systems or on systems that are located at remote offices. It may provide connections to the Internet or to the networks of other organizations.

A network typically includes a cable that attaches to a network interface card (NIC) in each of the devices within the network.

Users interact with network-enabled software applications to make a network request, such as to get a file or print on a network printer. An application may also communicate with the network software, and the network software may then interact with the network hardware to transmit information to other devices attached to the network.

A local area network (LAN) is a network located in a relatively small area, such as a department or building. A LAN typically includes a shared medium to which workstations attach and through which they communicate with one another by using broadcast methods. With broadcasting, any device on a LAN can transmit a message that all other devices on the LAN can listen to. The device to which the message is addressed actually processes the message. Data is typically packaged into frames for transmission on the LAN.

FIG. 1 is a block diagram illustrating a network connection between a user 2 and a particular web server 6. This figure is an example, which may be consistent with any type of network, including a LAN, a wide area network (WAN), or a combination of networks, such as the Internet.

When a user 2 connects to a particular destination, such as a requested web server 6, the connection from the user 2 to the web server 6 is typically routed through several routers 4A–4D. Routers are internetworking devices, typically used to connect similar and heterogeneous network segments into Internetworks. For example, two LANs may be connected across a dial-up, integrated services digital network (ISDN), or a leased line via routers.

Routers are also found throughout the Internet. End users may connect to local Internet Service providers (ISPs), which are typically connected via routers to regional ISPs, which are in turn typically connected via routers to national ISPs.

To move packets from one network to another, packet processing software is required on each router. Generally, packets received from a network are processed and forwarded to another network, based on information contained in layers 2 and 3 of the ISO 7-layer model.

Layer 2 (L2) of the ISO model is commonly referred to as the data-link layer. Ethernet, HDLC and PPP are examples of commonly used L2 protocols. Ethernet is commonly used in LANs, while HDLC and PPP are commonly used in WANs.

Layer 3 (L3) is commonly referred to as the network layer. Internet Protocol (IP) is the most commonly used L3 protocol. ARP, SAP and SNAP are IP-related protocols that, although not strictly in layer 2, are considered to be layer 2 protocols for purposes herein.

Layer 4 (L4) is commonly referred to as the transport layer. TCP is the most commonly used L4 protocol.

Router software designers use the term encapsulation to refer to the layering of protocols. A packet containing TCP, IP and ethernet protocols is said to have an encapsulation of TCP over IP over ethernet. A packet containing TCP, IP and HDLC protocols has an encapsulation of TCP over IP over HDLC.

The proliferation of features and protocols has greatly complicated the software involved in processing packets. Because of this, the software responsible for each layer must examine each packet to determine what the next step is in the handling of the packet.

For example, when a packet is received on an ethernet interface, the ethernet protocol handling software must examine the header, and based on values in the header, determine what to do with the packet. Data contained within a packet, for example, a type or length field in the protocol header, contains information about the next layer of the packet.

A traditional ethernet processing algorithm for this might be:

If type=IP and IP is configured for this interface
        Pass packet to IP code
    If type=ARP and ARP is configured for this interface
        Pass packet to ARP code
    If type=RARP and RARP is configured for this interface
        Pass packet to RARP code
    If type=IPV6 and IPV6 is configured for this interface
        Pass packet to IPV6 code
    . . .

Each time a new protocol is added, the ethernet code must be modified to handle the new protocol. This may be necessary for each layer every time new features or protocols are added. Router software has grown to the point where maintenance has become very difficult. Each change can cause wide variations in performance. A new method is thus needed to allow growth in features and protocols without affecting the stability of existing software.

SUMMARY OF THE INVENTION

The present invention solves the above problems by logically separating the various packet operations into chain elements. These elements are then dynamically chained together as needed, at runtime, to form encapsulation and decapsulation chains.

The chains can also be dynamically rebuilt upon a change of configuration. Such changes typically come from a customer command line interface, however, in some cases there may be features that are configured after a protocol negotiation.

With the employment of chains, developers of new features do not need to change existing code to introduce the new features. Instead, new chain elements can be developed and inserted into existing chains as necessary.

As a result of the improved modularity, performance is improved for complex operations.

Accordingly, a method for processing packets in a router includes specifying packet processing function elements and linking them together to form chains. Each chain is associated with a unique interface/protocol pair. As used herein, a protocol may be a router-level protocol such as IP, or it may be a bridge-level protocol. Furthermore, the term protocol is meant to encompass the concept of tunneling, where a packet which has already been encapsulated using one protocol is further encapsulated using the same or a different protocol at the same level. In such a case, one or more virtual interfaces may be encountered by a packet which encapsulate and decapsulate the packet according to various protocols. An interface, then, is simply the target of a packet, and may be implemented in hardware, software, or both.

Each processing element within a chain performs at least one function on a packet. An incoming packet is received, and processed, first by a demultiplexor (demux) element which determines the protocol of the next higher level used by the packet. Then, the packet is processed by the elements of a decapsulation (decaps) chain associated with the interface on which the packet was received, and by the elements of an encapsulation (encaps) chain associated with the interface on which the packet is to be transmitted.

In one embodiment, the demultiplexor element or operation passes the packet on to a decapsulation chain associated with the protocol and with the incoming interface, depending on protocol information contained in the incoming packet. The protocol information may be contained, for example, in a type or length field in a header.

Decapsulation and encapsulation chains can be built dynamically, by inserting new and removing old elements as necessary as new protocols are developed and new features added.

In addition to decapsulation, the decapsulation chain can include functions including, but not limited to, decryption, decapsulation And filtering. Similarly, an encapsulation chain can include, in addition to an encapsulation operation, encryption, compression, flow control and filtering functions, as well is other function.

A chain walker walks through the chains, passing the processed packet to each element in a chain, until either the end of the chain is reached and processing is complete, or until the packet is dropped because no function can process it, or because a packet is processed by an outside process or by hardware, which may optionally stop the chain walk.

A chain walk may be temporarily halted, or may be terminated. If temporarily halted, the chain walk can be resumed at any element in the chain, depending on the packet's requirements. A chain walk can also begin at any element in a chain.

A packet may be intended for the router, in which case processing ends after the decapsulation chain terminates. In addition, the router itself can generate packets. The destination or outgoing interface is determined, and the packet is processed by executing processing elements within a selected encapsulated chain associated with the outgoing interface. Finally, the packet is transmitted from the outgoing interface.

Preferably, an embodiment uses a chain walker which, upon receipt of an incoming packet in an incoming interface, executes the demux chain associated with the incoming interface, a decapsulation chain associated with the incoming interface, and an encapsulation chain associated with an identified outgoing interface. After an element is executed from chain walker, the element returns a reference to the next element in the chain. The chain walker then executes the referenced next element. On the other hand, if the element returns a null reference, the chain walker stops.

In addition, a return code can notify the chain walker that the packet should be dropped.

One embodiment implements the chains and chain walker using an interface descriptor block (IDB) associated with each interface. An IDB includes a reference or pointer to a demux element associated with the associated interface, a reference to a decapsulation chain array, and a reference to an encapsulation chain array. Each encapsulation or decapsulation array holds references or pointers to chains of encapsulation or decapsulation processing elements, respectively.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
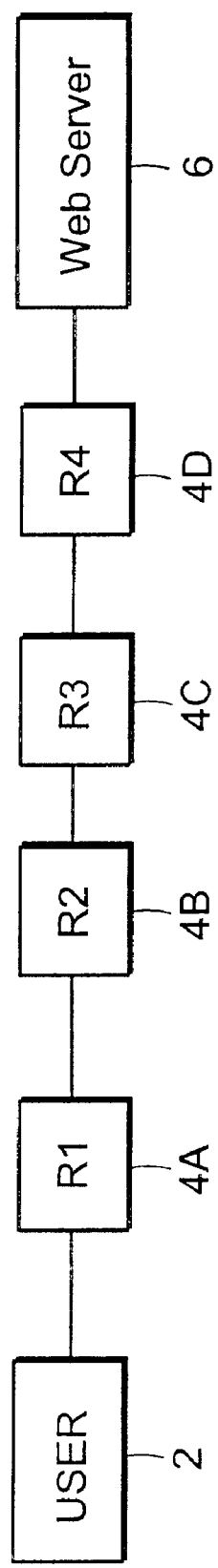
FIG. 1 is a block diagram of an example of a network connection between a user and a web page.
Figure 2:
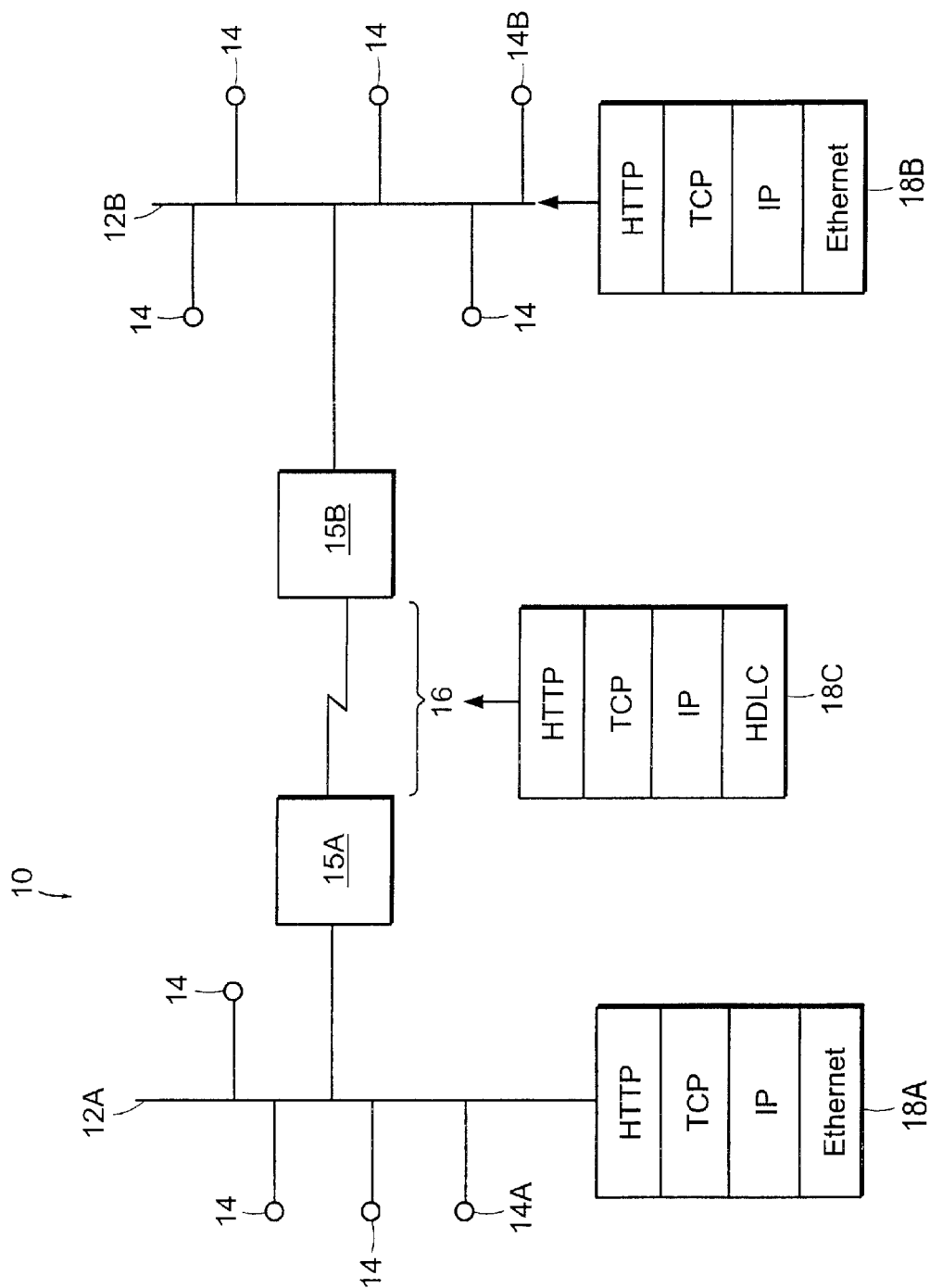
FIG. 2 is a block diagram illustrating a simple network connecting a user on an ethernet LAN to a remote server on a different ethernet LAN, with a serial WAN using HDLC connecting the two LANs.

FIG. 2 illustrates a simple network 10 to which several systems 14 are connected. In particular, the network 10 connects a user 14A on one ethernet LAN 12A wit a remote server 14B on a different ethernet LAN 12B, with a serial WAN 16 using HDLC to connect the two LANs 12A, 12B. Two routers 15A and 15B provide the interfaces between the two types of networks.

The ethernet LANs 12A, 12B use ethernet protocol, while the serial WAN 16 uses HDLC protocol. For a TCP packet to reach the server 14B, the routers 15A, 15B must change the encapsulation from ethernet to HDLC, and then back to ethernet. These encapsulations are associated with and configured for each interface.

Local area network 12A uses, for example, the protocol shown in block 18A. Here, HTTP protocol is used by the application. TCP and IP protocols as well as ethernet protocol are used throughout the local area network. The same protocols are used in local area network 12B as shown in block 18B.

The wide area network 16, however, uses HDLC protocol instead of ethernet, as shown in block 18C, because this protocol is better suited to wide area networks. Therefore, it is necessary for the routers 15A, 15B to translate packets from the ethernet Protocol to HDLC protocol and back to ethernet protocol.

Figure 3:
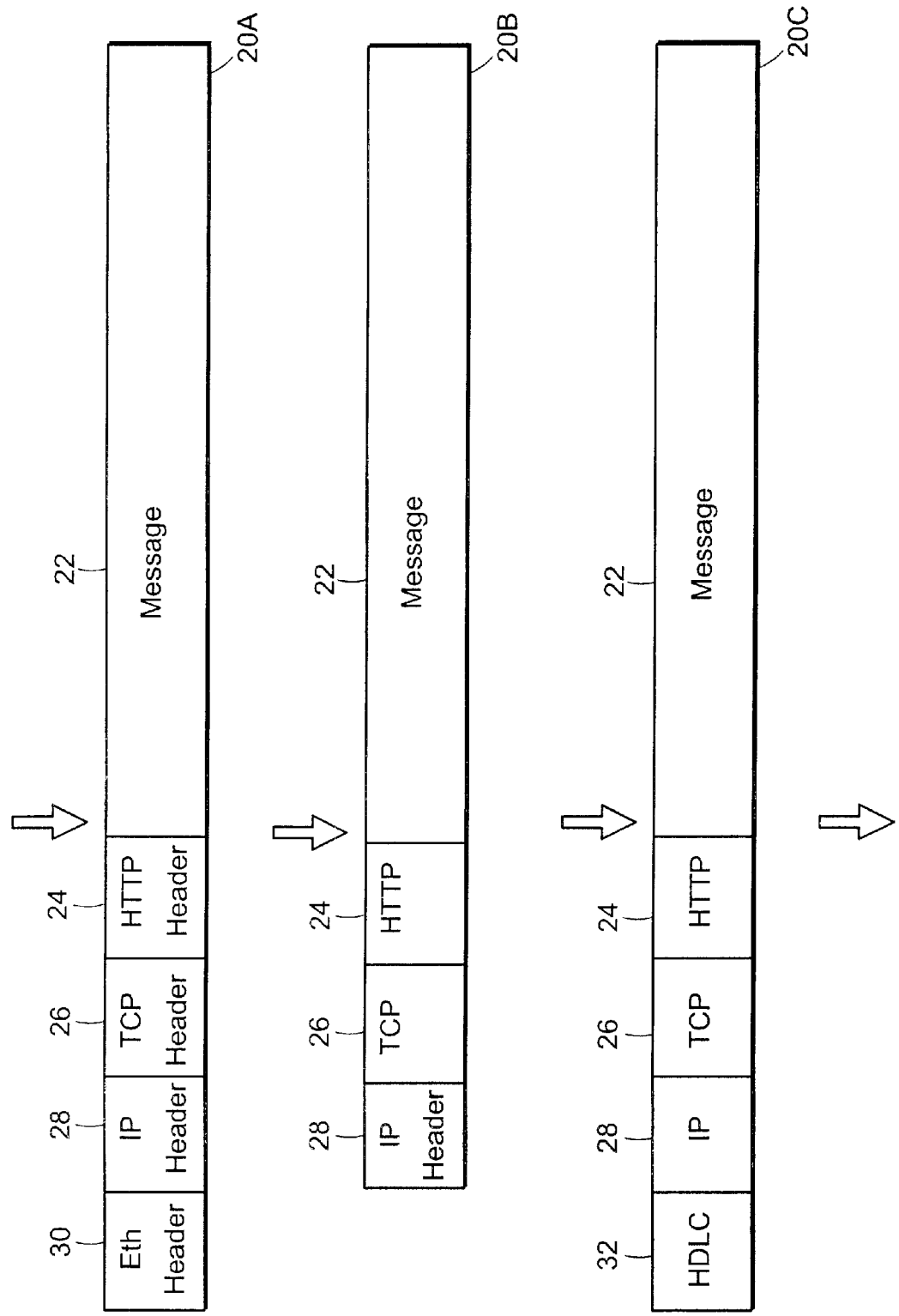
FIG. 3 is a schematic diagram illustrating decapsulation and encapsulation of a message as performed by a router.

FIG. 3 illustrates basic decapsulation and encapsulation as performed by router 15A of FIG. 2. An incoming packet 20A contains a message or other data 22 which is encapsulated with an HTTP header 24 which in turn is encapsulated with a TCP header 26. This in turn is encapsulated with an IP header 28 and the packet is finally encapsulated in an ethernet frame, including an ethernet header 30.

The router 15A reformats and readdresses the packet by stripping off the ethernet header 30, or decapsulating the frame, and reading the IP header 28 to obtain a destination address. The packet now appears as shown at 20B.

Next the router prepends the packet with an HDLC header 32 as shown at 20C. The router has thus encapsulated the message in a HDLC packet format.

In practice, the decapsulation and encapsulation processes can be more complex, including compression, encryption and other functions. The present invention breaks these functions into individual elements, and dynamically chains the elements together at runtime, as needed, using a linked chain structure in one embodiment. For example, a chain can be dynamically built at the start of a session. Each session can then have its own chain.

A chain walker processes a packet by walking through a chain, passing the packet to each element in the chain, until either processing is completed, the chain is halted, or the process is dropped. Each element also has the ability to "punt" the packet to an external software or hardware function, and the punted packet may be returned anywhere in the chain, or may not be returned at all.

Figure 4:
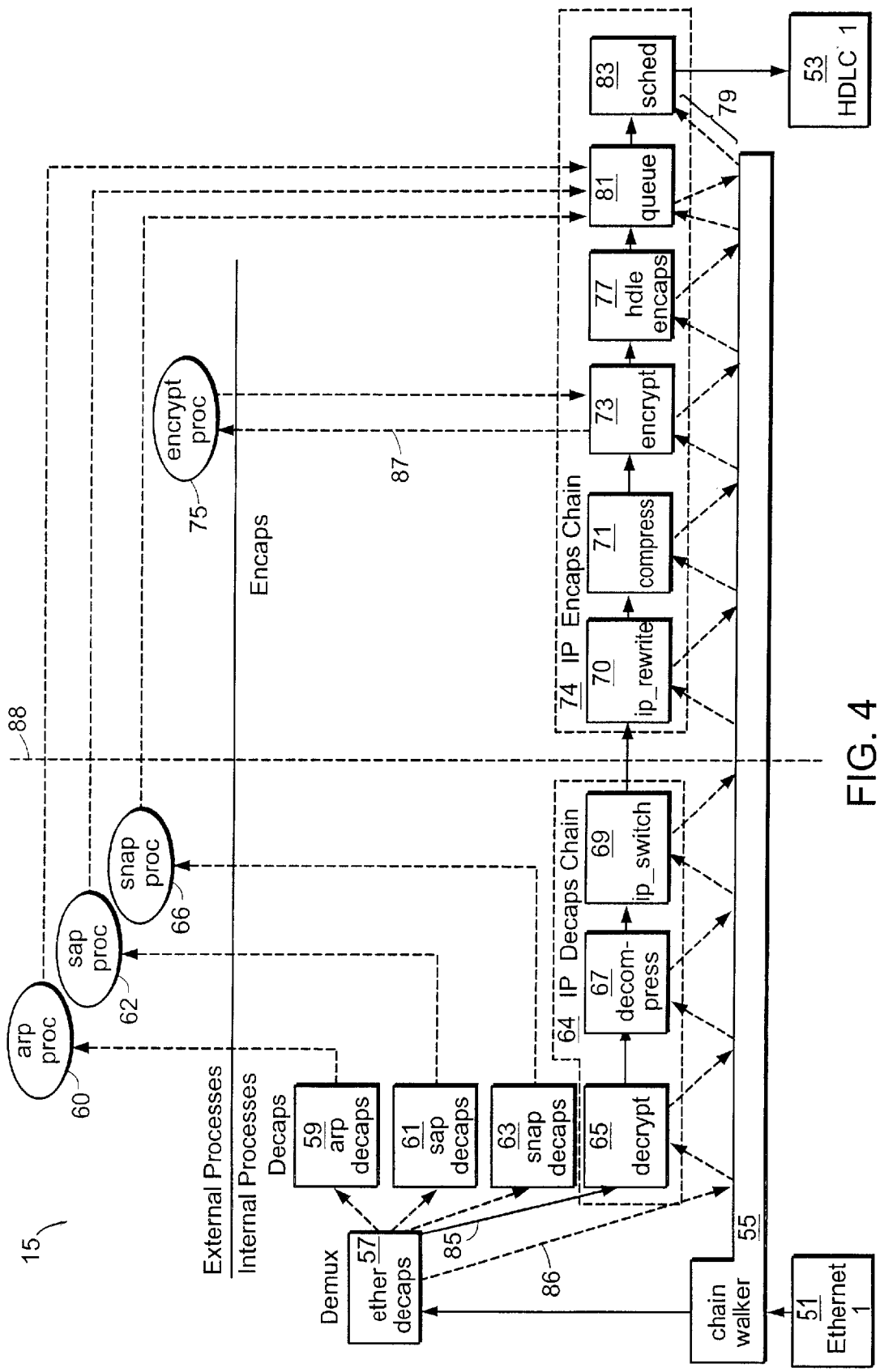
FIG. 4 is a schematic diagram illustrating an embodiment of the present invention including a chain walker.

FIG. 4 illustrates an embodiment of the present invention. The router shown 15 represents either router 15A or 15B of FIG. 2. While a typical router may have multiple interfaces, only two 51, 53 are shown in FIG. 4.

When a packet is received by the router 15, it is passed to the chain walker 55. The chain walker 55 in turn retrieves a pointer to a de-multiplexor, or demux, element. Because in this example, interface 51 is an ethernet interface, the demux element 57 performs an ethernet decapsulation operation. For other types of interfaces, other decapsulation functions would be used in the demux chain.

The demux operation or element 57 determines the protocol of the next higher level (L3) used by the incoming packet, and passes the packet to an appropriate decapsulation chain. Although it will be understood that there can be many more, four possible decapsulation chains are shown: an ARP decapsulation chain comprising a single element arp_decaps 59; a SAP decapsulation chain comprising a single element sap_decaps 61; a SNAP decapsulation chain comprising a single element snap_decaps 63; and a multi-element IP decapsulation chain 64.

Of course, other decapsulation chains can exist for processing other protocols as well. For illustrative purposes, assume the packet uses internet protocol (IP). In this case, the demux element Ether_decaps 57 returns a pointer to the first element 65 of the IP decapsulation chain 64 to the chain walker 55, as indicated by dotted line 86. Logically, decrypt 65 follows ether_decaps 57 as indicated by solid arrow 85.

Decrypt 65 is the first element in the IP decapsulation chain 64. In this example, the decapsulation chain 64 is shown to comprise a decryption element 65, a decompression element 67, and an ip_switch element 69. In an actual application, some or all of these elements may be absent, or additional elements may be in the chain.

In actuality, for IP packets that are switched, there is no decapsulation, although the term "decapsulation chain" is retained. The ip_switch element 69 determines if the packet is to be switched or punted for further processing. For A TCP packet that is destined for the router itself, the actual decapsulation is performed in the IP process after the packet has been punted. Similarly, the arp_decaps element 59 simply punts the packet to the ARP process.

As indicated by the dashed lines 79, the process of chain walking can be implemented by having each chain element return to the chain walker 55 a pointer to the next chain element. The chain walker then calls the next element in the chain.

After decapsulation, the router must prepare the packet for further transmission by encapsulating it in the desired protocol, assuming the packet is not intended for the router itself. Dashed line 88 separates the decapsulation chain 64 from the encapsulation chain 74. The packet is passed from the ip_switch element 69 to an encapsulation chain 74 associated with the intended output HDLC interface 53, beginning with the ip_rewrite element 70. Ip_rewrite 70 performs functions such as updating (decrementing) the time-to-live count in an IP packet's header, and recalculating the check sum for the IP header.

The packet is then passed to the compression element 71, the encryption element 73 and finally to an HDLC encapsulation element 77. The encapsulation element 77 then passes the packet to the queue 81 for the intended output interface 53. A scheduler 83 removes the packet from the queue 81 and transmits via the HDLC interface 53.

Packets do not need to be switched in the de-encapsulation chain walk. Rather, they can be handed to an outside process for further processing and then passed back to the start of the encapsulation chain. This is done for 'ping' packets that are destined for the router, for example. A chain walk can be stopped, started or resumed from any point on the chain. This allows elements such as an encryption element to pass the packet to an outside process, or piece of hardware, to perform the actual encryption.

The processed packet may then be passed back to continue the chain walk. This mechanism is called 'punt' and 'puntback'. The punting element hands the packet to the outside process or hardware. If the punting element wants the packet to resume the chain walk at the next element in the chain, it stores the chain next node pointer in the packet. The puntback routine starts the chain walk with the node previously stored in the packet.

For example, as indicated by lines 87, an element such as encryption element 73 can pass the packet to an encryption process 75 which is external to the chain. This is known as "punting" the process packet. The packet may be returned to the punting element, encryption element 73 in this example, after processing.

Alternatively, the chain walk could resume processing with any element in the chain.

ARP, SAP and SNAP are various protocols which fall under the IP protocol family. As shown with respect to the ARP, SAP and SNAP decapsulation elements 59, 61 and 63 respectively, packets may be processed by additional processes 60, 62, 66 external to the chains. Packets processed by these functions 60, 62, 66 may then be queued directly at queue 81 without passing through an encapsulation chain.

Of course, while only IP, ARP, SAP and SNAP decapsulation chains are shown, additional protocols can also be supported for this interface 51. Each protocol would have its own decapsulation chain.

Note that although the incoming and outgoing interfaces are typically different interfaces, this is not always true. For example, Ping and ARP are protocols where the incoming and outgoing interface is typically the same interface.

Figure 4A:
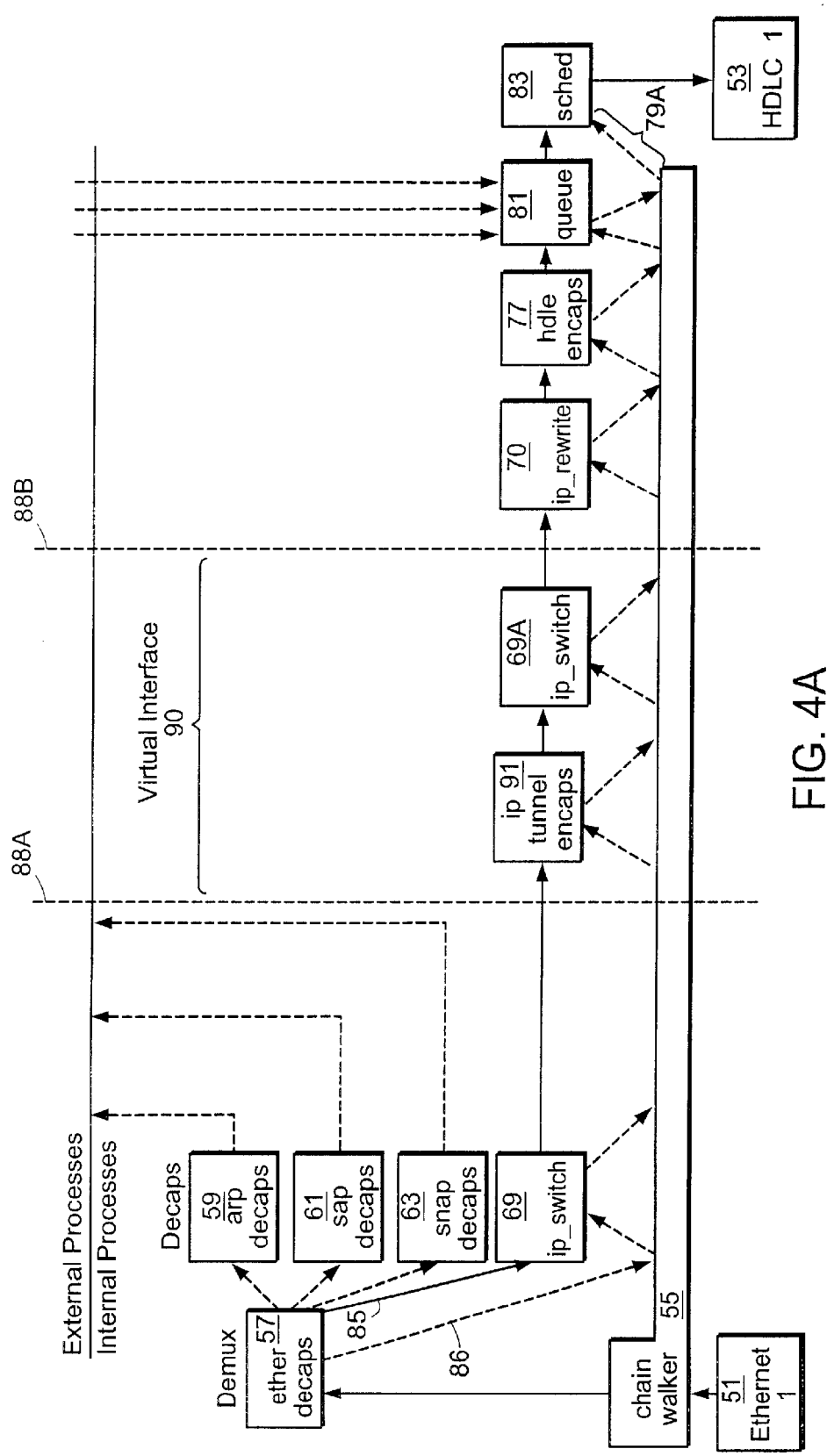
FIG. 4A is a schematic diagram illustrating an embodiment of the present invention having a virtual interface.

FIG. 4A illustrates an embodiment of the present invention having a virtual interface 90, which has been inserted at the interface 88 (FIG. 4) between the incoming and outgoing chains.

Lines 88A and 88B represent the beginning and ending edges of the virtual interface 90, respectively. Message packets pass from the ip_switch element 69 to the ip_encaps element 91 within the virtual interface 90. The ip_tunnel encaps element 91 encapsulates the IP packet into another IP packet, i.e., it implements IP over IP, and passes the tunneled packet to an ip_switch element 69A, which may or may not be the same as ip_switch 69 in the incoming chain. The encapsulated IP packet is then passed out of the virtual interface 90 across line 88B to the encapsulation chain, specifically to the ip_rewrite element 70.

Figure 4B:
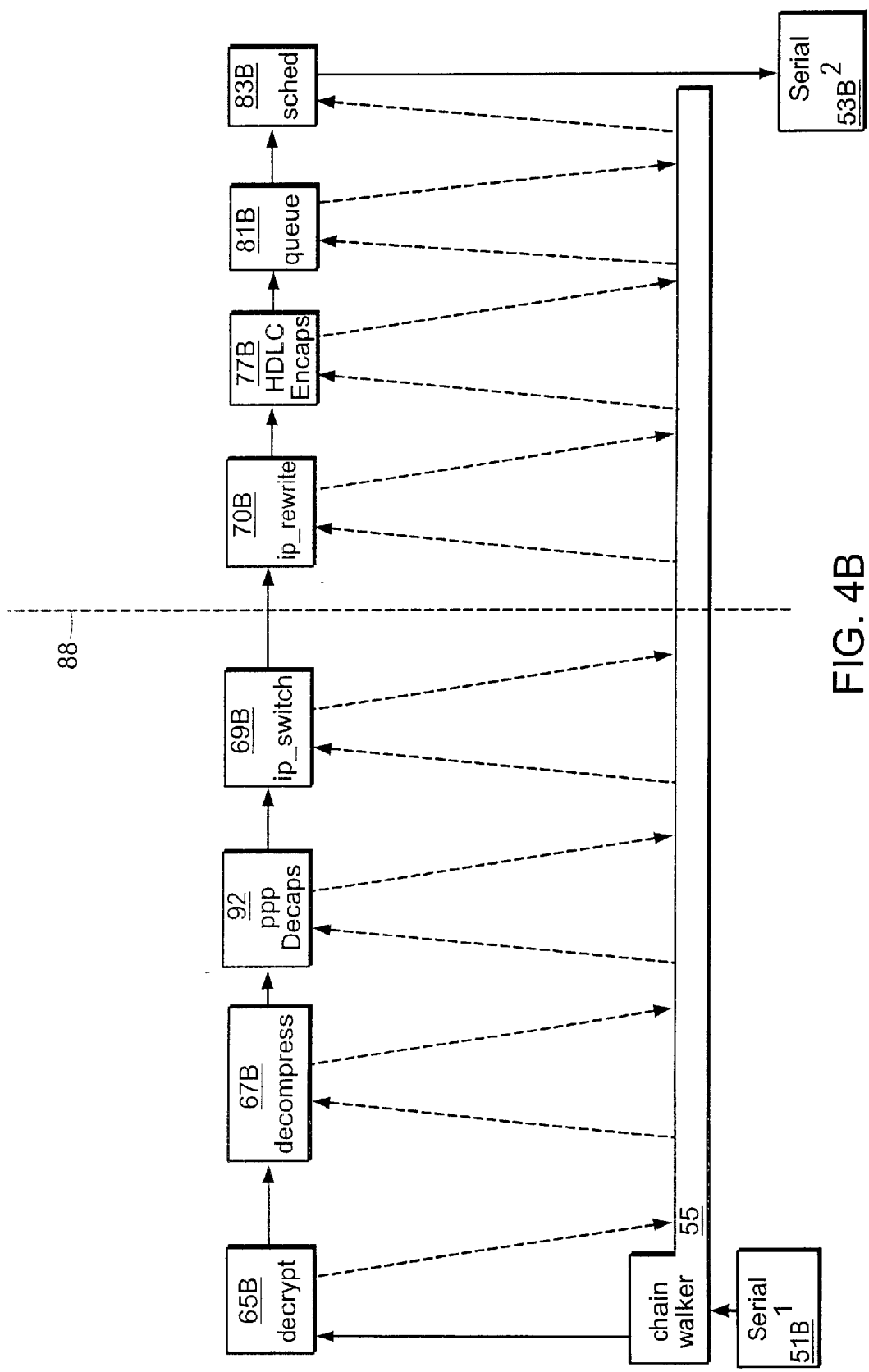
FIG. 4B is a schematic diagram of an embodiment of the present invention with different chains than those of the previous figures.

FIG. 4B illustrates chains which are more practical than those of FIG. 4, which shows many elements for illustrative purposes.

FIG. 4B shows two interfaces: Serial 1 51B and Serial 2 53B. The decaps chain encompasses a decryption element 65B, a decompress element 67B, a point to point protocol (PPP) decapsulation element 92, and an ip switch element 69B. The encapsulation chain comprises an ip_rewrite element 70B, HDLC encapsulation element 77B, and queue element 81B, followed by a schedule element 83B which passes the packet to the output serial port Serail 2 53B.

Figure 4C:
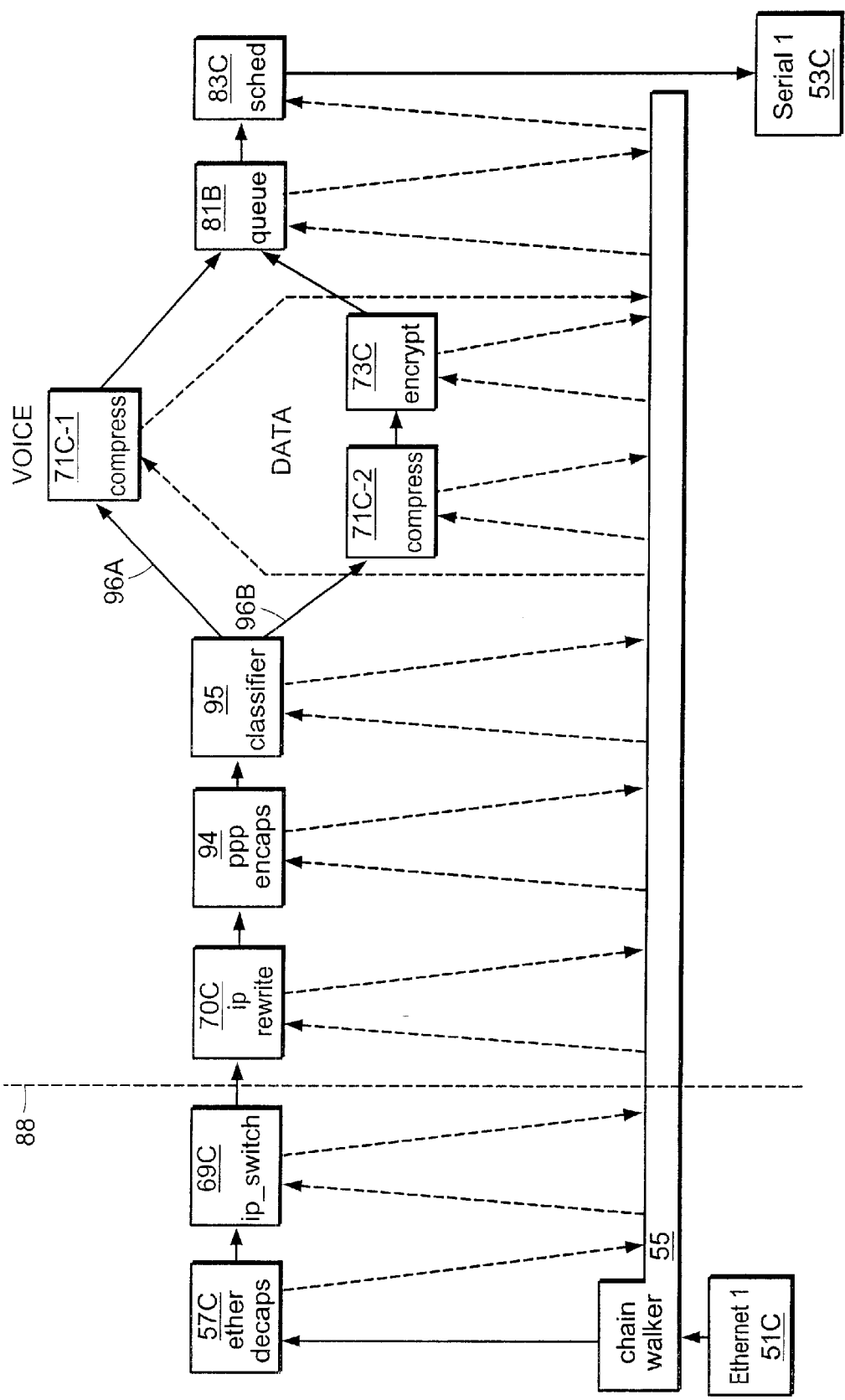
FIG. 4C is a schematic diagram of an alternative embodiment of the present invention illustrating a non-sequential chain.

FIG. 4C is a schematic diagram of an alternative embodiment of the present invention illustrating a non-sequential chain. In this example, the incoming interface is Ethernet 1 51C and the outgoing interface is Serial 1 53C. The decapsulation chain comprises an ethernet decapsulation module 57C followed by ip_switch 69C.

Ip_switch 69C passes the packet to the encapsulation chain through the interface 88, to ip_rewrite 70C which, among other tasks, updates the time-to-live counter and updates the header checksum accordingly. The updated packet is then passed from ip_rewrite to a PPP encapsulation element 94.

The classifier element 95 then examines the packet, for example, for packet type or some other characteristic. For example, packets may be voice or data, as shown in FIG. 4C. In the case of voice, the packet is passed along path 96A. Voice data is compressed in this example by compression element 71C-1.

In the case of data, the packet is passed along path 96B. In this example, the packet's data is compressed by compression element 71C-2, which may use a different compression scheme than the voice compression element 71C-1. The packet is then encrypted by encryption element 73C. Packets from either path are then passed to queue element 81C, and finally to the scheduler element 83C which then outputs the packet through serial interface 53C.

Of course, packets characteristics are not limited to just data and voice. These are simply offered as examples. Packet characteristics on which the classifier 95 may base a decision, include but are not limited to, for example, protocol type, e.g., IP, TCP, UDP, HTML, ARP, FTP, etc., characteristics such as broadcast, multicast, unicast, etc., TCP or UDP port number, source and/or destination address, media type such as voice, data, or video.

As with all other elements in the chain, the classifier 95 passes, to the chain walker 55, a pointer to the next element. However, in one embodiment, the classifier 95 uses internal knowledge plus its analysis of the packet type to decide along which chain path 96A, 96B to send the packet. Thus, the chain is not sequential, in that there are multiple branches a chain may take.

Figure 4D:
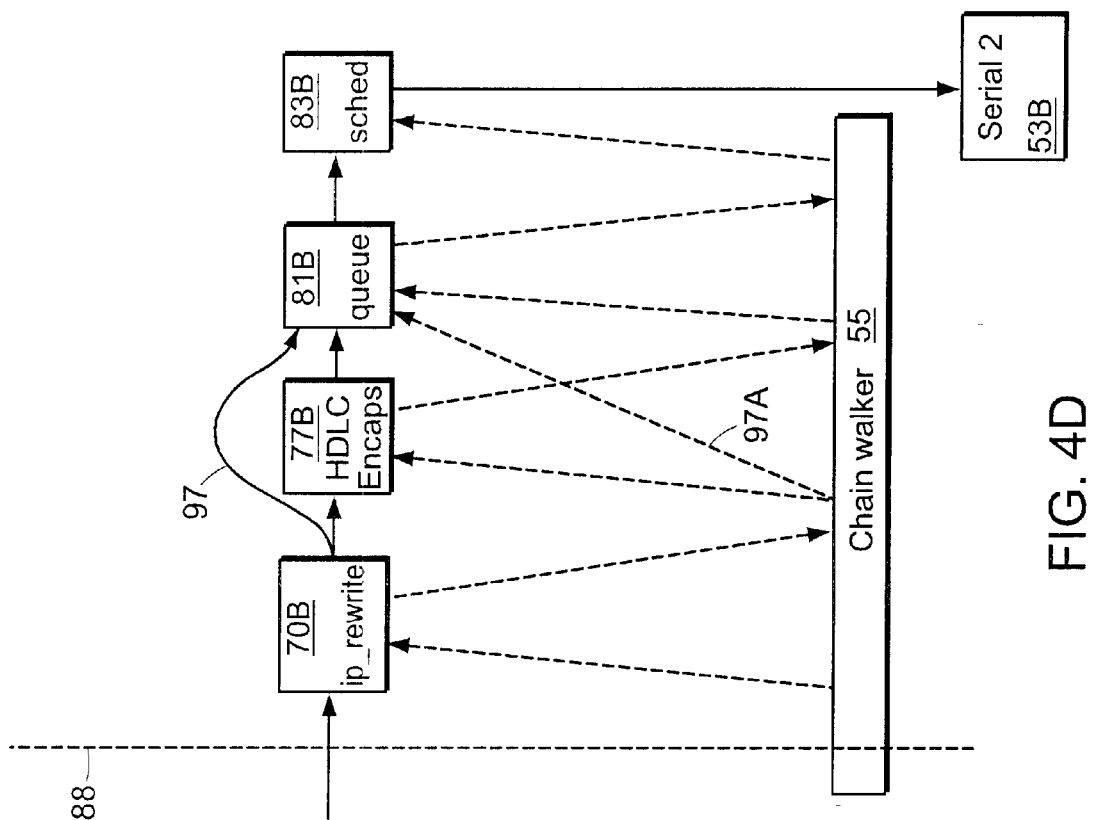
FIG. 4D is a schematic diagram of an alternative embodiment of the present invention illustrating another non-sequential chain.

FIG. 4D is a schematic diagram of another chain which can be implemented by a non-sequential embodiment. FIG. 4D shows just an encapsulation chain. A packet is received, from the incoming interface, or alternatively, from a virtual interface, by the ip_rewrite element 70B. In the event ip_rewrite 70B already knows how to encapsulate the packet, it performs the encapsulation, and there is no need to execute the HDLC encapsulation element 77B. The encapsulation element 77B is thus skipped by having the packet take the path 97. In this case ip_rewrite 70B passes back a pointer to the next element to be executed through path 97A, the next element being the queue element 81B.

If ip_rewrite 70B does not know how to encapsulate the packet, it will process the packet normally and return a pointer to HDLC encapsulation element 77B to the chain walker 55.

Finally, the packet is passed from queue element 81B to the scheduler 83B and transmitted out through the Serial 2 port 53B.

The advantage of this, embodiment is that it cuts out the extra processing required to do an extra chain walk. Often, ip_rewrite 70B will know how to encapsulate a packet based on destination. This information may be returned, for example, by the HDLC encapsulation element 77B after the first encapsulation of the packet. Ip_rewrite 70B can then store this information and use it for later packets with the same destination or within the session.

There are other reasons for having non-sequential chains. For example, different types of encryption could be applied to packets depending on destination, type or some other attribute. Furthermore, ip_rewrite can observe the congestion on the network and for example, skip right to the scheduler if there is no congestion. In very fast Ethernet, for example, a router needs to get packets in and out fast. By allowing the chain elements to be skipped or executed in a non-sequential way, packets are routed through the router expediently.

Another example where non-sequential chains is useful is, for example, in implementing an access list or other filter. Different chain elements can be executed depending on the destination and/or depending on access rights.

The element which causes the non-sequential skip, such as the classifier 95 of FIG. 4C, can have internal data which allows it to determine, when a chain is built, what the jump targets are. Determination may be based on data stored by or for the classifier 94, and based on the incoming packet itself.

More generally, different feature sets may be applied to packets depending on their source address, destination IP address, types or other attributes. The classifier element 95 can, for example, maintain this information in an internal data base and return, to the chain walker 55, a pointer to the applicable element.

Figure 5:
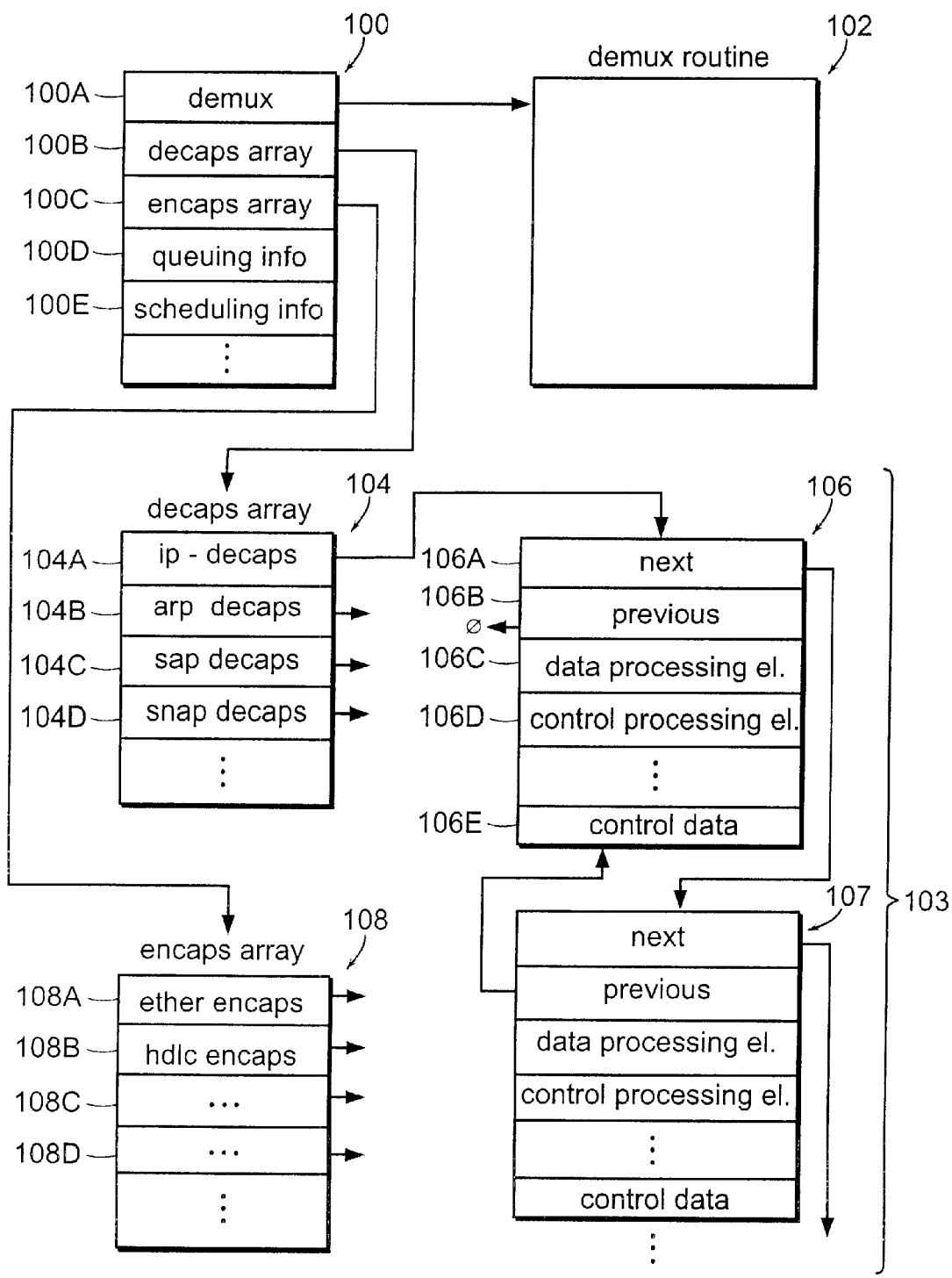
FIG. 5 is a schematic diagram of the data structures used to implement decapsulation and encapsulation chains of the present invention.

FIG. 5 illustrates the data structures used to implement sequential decapsulation and encapsulation chains, as well as the sequential portions of non-sequential chains. First, a separate interface descriptor block (IDB) 100 is defined for each interface. Each IDB 100 includes several fields including a demux field 100A, a decaps array pointer 100B, an encaps array 100C, queuing information 100D and scheduling information 100E.

The demux pointer 100A points to a demux element 102. The demux element 102 is typically the only element in the demux chain. It is responsible for removing the outer encapsulation, e.g., ethernet or HDLC, of an incoming packet, and for examining the packet to determine which protocol the packet uses.

The decaps array pointer 100B of the IDB 100 points to a decaps array 104. The decaps array 104 holds pointers 104A–104D to the first elements of various decapsulation chains associated with the various protocols. For example, the first entry 104A in the decaps array 104 is a pointer to the first element 106 of an IP decapsulation chain 103.

In one embodiment, each chain element has the structure shown at 106. A next field 106A points to the next element in the chain. A previous field 106B points to the previous element in the chain, and is 0 or some other null indicator for the first element. Furthermore, each chain element 106 contains a data processing element pointer 106C and a control processing element pointer 106D which point to the actual processing elements. Control data 106E may also be contained in the chain element 106.

A second chain element 107 is shown. The chain may contain a plurality of elements. Each element returns a pointer to the next element to be executed to the chain walker.

Similarly, the encaps array pointer 100C in the IDB 100 points to an encaps array 108. Each entry in the encaps array 108 points to an encapsulation element for a specific protocol. For example, the first entry 108A is a pointer to an ethernet encapsulation element. The next entries 108B–108D contain pointers to encapsulation chain elements for other protocols, such as HDLC.

Figure 6:
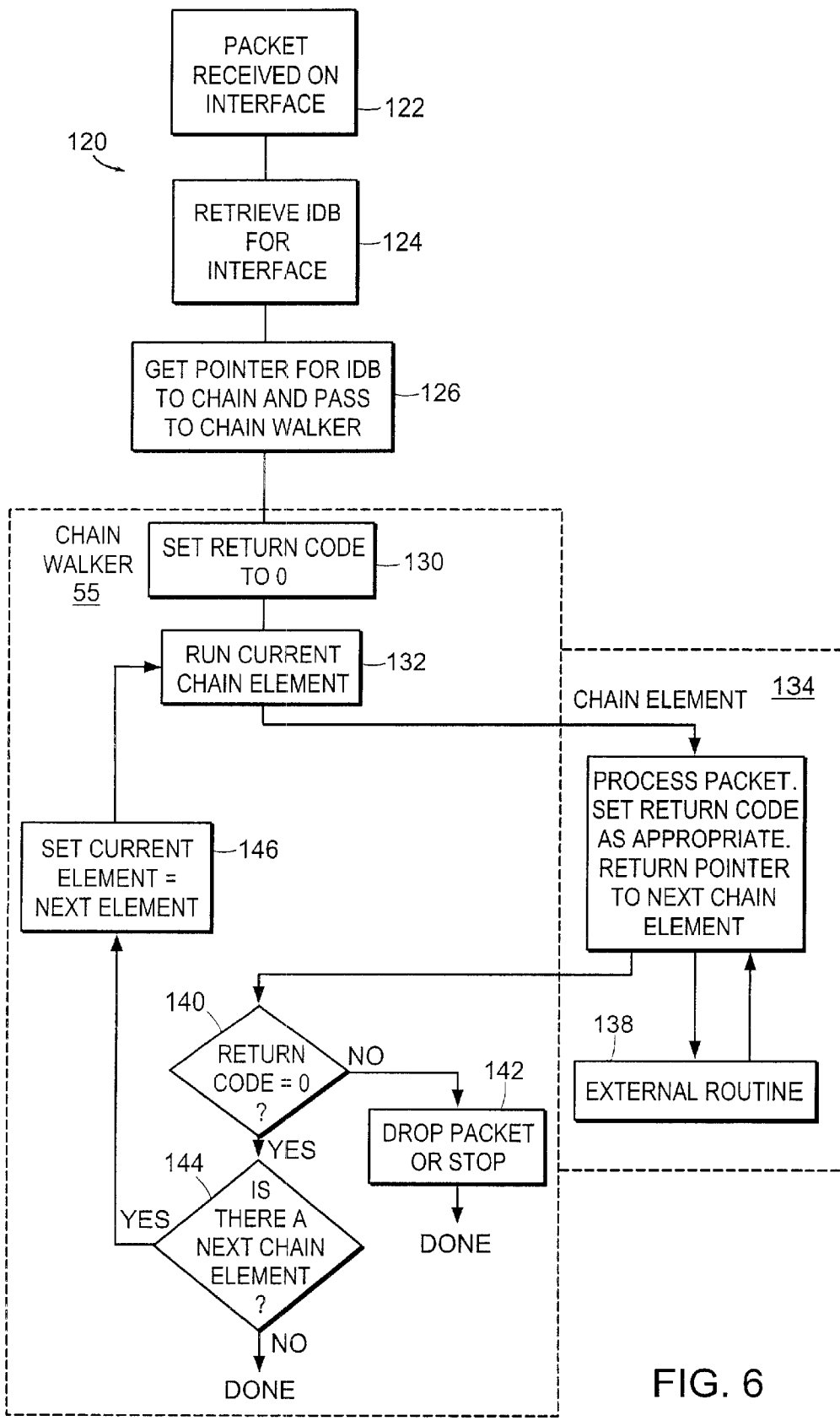
FIG. 6 is a flowchart illustrating an embodiment of the chain walker.

FIG. 6 is a flow chart 120 illustrating an embodiment of the present invention.

First, at step 122, a packet is received on an interface. Then, at step 124, an IDB is retrieved which is associated with that interface. At step 126, a pointer to the demux chain is retrieved from the IDB, and passed to the chain walker.

The chain walker 55 receives the packet and the pointer from the IDB and sets a return code to 0 at step 130. At step 132 the chain walker executes the current chain element pointed to by the pointer received from the IDB. A typical chain element is shown at 134. Each element 134 on the chain processes the packet, and can return the next element to the chain walker or set the return code to 0 to stop the chain walk. The return code is set to a value less than 0 if, for some reason, the element 134 cannot process the packet, in which case the packet is to be dropped. Otherwise, the chain element 134 returns to the chain walker a pointer to the next chain element.

As described earlier in the description of FIG. 4, a chain element 134 may punt or pass the packet to an external routine or to hardware 138 for further processing. The external routine or hardware 138 processes the packet, and may return control to the chain element, as shown. Alternatively the external routine or hardware 138 may pass the packet to another chain or may halt the process.

A code value is also used to notify the chain walker as to whether it should continue. If the packet was passed to a higher layer for further processing, the code is set to a value that tells the chain walker to do nothing more. If the packet is to be dropped, the code is set to a value that tells the chain walker to drop the packet.

When the packet is returned to the chain walker, in step 140 the chain walker determines whether the return code is 0. If not, either the packet is dropped at step 142 or the chain walker stops. If the return code is 0, then at step 144, the chain walker determines whether a chain element has been returned. If so the chain walker sets the current element to the next element at step 146 and returns to step 132 to execute the next chain element. This loop is repeated until either the packet is dropped or until there are no more chain elements.

During initialization, the router's hardware control software determines which network interfaces exist on the router. An IDB 100 (FIG. 5) is created for each interface. The demux, decapsulation element and the encapsulation element fields are initially empty.

A default demux element is associated with each interface based on the interface media type, e.g., ethernet, HDLC, etc. Configuration information is determined for each interface, for example, by reading it from a file or from a programmable memory. Default queuing and scheduling elements are then added to the chain. Finally, decapsulation and encapsulation elements are added to each interface according to the protocols available as determined by the configurations.

Once the chain for an interface is built, the interface is ready for packet processing. When a packet is received by an interface it is handed to the chain walker, as described with respect to FIG. 4. The chain walker has no knowledge of protocols. For an encapsulation of IP over ethernet, the chain might include only an IP decapsulation element, followed by an encapsulation chain comprising ethernet encapsulation, queuing and scheduling elements.

Chains can have elements added or deleted based on configuration. Each element in a chain has no specific knowledge of the other elements on the chain. The chain walker has no knowledge of the number of elements or types of protocols on a chain. Each element or node on the chain determines the whether or not the chain walk continues based on its processing of the packet.

The above chain could thus be modified by inserting elements into the chains without changing the ethernet, IP, queuing or scheduling elements. For example, an ethernet address filter could be inserted before the IP decapsulation element, or a new compression element could be inserted at the beginning of the encapsulation chain.

For packets entering the router from an interface, the chain walker typically starts with the demux element. While there can be any number of encapsulation and de-encapsulation elements chained together on an interface, there is typically only one demux element for each interface. For packets that are sourced on the router, the chain walk starts with the first encapsulation element.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for processing packets, comprising:

specifying a chain of function elements, each element capable of performing an operation on a packet, the chain being associated with an interface and a protocol;

processing the packet by walking through the elements of the chain;

receiving an incoming packet at a first interface, the packet being encapsulated according to a first protocol, wherein processing of the packet is performed by a decapsulation chain associated with the first interface and with the first protocol;

upon completion of processing by the decapsulation chain, passing the packet to and processing it in an encapsulation chain associated with a second interface and a second protocol; and transmitting the processed packet from the second interface.

2. The method of claim 1, wherein a plurality of chains is associated with the interface, each chain being associated with a unique protocol.

3. The method of claim 2, wherein an element belongs to one or more chains.

4. The method of claim 2, wherein a unique protocol comprises a bridge-level protocol.

5. The method of claim 2 wherein a unique protocol comprises a router-level protocol.

6. The method of claim 2 wherein a unique protocol comprises a tunneling protocol.

7. The method of claim 1, wherein protocol information about a packet is contained in the packet.

8. The method of claim 1, further comprising:

building the chain dynamically.

9. The method of claim 8 wherein the chain is dynamically built for a session at the session's start.

10. The method of claim 1 wherein the first interface and the second interface are different.

11. The method of claim 1 if wherein the first interface and the second interface are the same.

12. The method of claim 1 if wherein an interface is a virtual interface.

13. The method of claim 1 if wherein the first protocol and the second protocol are different.

14. The method of claim 1, wherein a demultiplexor chain, responsive to protocol information contained in the received packet, passes the packet on to the encapsulation chain.

15. The method of claim 1, wherein the encapsulation chain performs any or all of:

encapsulation, encryption, compression, flow control and filtering.

16. The method of claim 1, wherein the decapsulation chain performs one or many of: decapsulation, decryption, decompression and filtering.

17. The method of claim 1, further comprising:

stopping a chain walk at any element in a chain.

18. The method of claim 17, further comprising:

upon stopping a chain walk, passing the packet to a process external to the chain.

19. The method of claim 18, wherein the external process is implemented by software.

20. The method of claim 18, wherein the external process is implemented by hardware.

21. The method of claim 18, wherein the external process is implemented by a combination of software and hardware.

22. The method of claim 18, further comprising:

resuming a chain walk at any element in a chain.

23. The method of claim 1, further comprising:

starting a chain walk at any element in a chain.

24. The method of claim 1, further comprising:

generating the packet in a selected protocol;

determining an interface through which to transmit the packet;

processing the packet by walking through the elements of an encapsulation chain associated with the interface and the protocol; and transmitting the packet from the interface.

25. The method of claim 1, further comprising:

from each element in the chain, returning, to the chain walker, a pointer to the next element.

26. A router for a computer network, comprising:

a plurality of interfaces, each interface associated with
a demultiplexor chain,
an array of protocol decapsulation chains, and
an array of protocol encapsulation chains,
each chain comprising at least one packet-processing element, the elements in a chain being linked; and a chain walker which, upon receipt of an incoming first protocol packet in a receiving interface,
passes the packet to the demultiplexor chain associated with the receiving interface for processing,
passes the processed packet to and walks through a decapsulation chain associated with the incoming interface and the first protocol, for further processing, and
passes the further processed packet to and walks through an encapsulation chain associated with an identified transmitting interface and identified second protocol.

27. The router of claim 26 wherein the chain walker walks through a chain by executing the chain's elements, wherein each element either returns a reference to a next element in the chain to be executed, wherein the chain walker executes the referenced next element, or returns a null reference, wherein the chain walker stops.

28. The router of claim 27, further comprising, for each interface, an associated interface descriptor block, each interface descriptor block comprising:

a reference to the demultiplexor chain associated with the interface;

a reference to the decapsulation chain array associated with the interface; and a reference to the encapsulation chain array associated with the interface.

29. The router of claim 28, wherein each encapsulation or decapsulation array comprises references to chains of encapsulation or decapsulation processing elements, respectively.

30. A program storage device readable by a machine, tangibly embodying a program of instructions executable by the machine to perform method steps of processing packets, the method steps comprising:

specifying a chain of function elements, each element capable of performing an operation on a packet, the chain being associated with an interface and a protocol;

processing the packet by walking through the elements of the chain;

receiving an incoming packet at a first interface, the packet being encapsulated according to a first protocol, wherein processing of the packet is performed by a decapsulation chain associated with the first interface and with the first protocol;

upon completion of processing by the decapsulation chain, passing the packet to and processing it in an encapsulation chain associated with a second interface and a second protocol; and transmitting the processed packet from the second interface.

31. A computer program product for use in a computer network router, the computer program product comprising a computer usable medium having computer readable program code means embodied in the medium for causing processing of a packet, the computer usable medium comprising:

computer readable program code means for causing a router to specify a chain of function elements, each element capable of performing an operation on a packet, the chain being associated with an interface and a protocol;

computer readable program code means for causing a router to process the packet by walking through the elements of the chain;

computer readable program code means for receiving an incoming packet at a first interface, the packet being encapsulated according to a first protocol, wherein processing of the packet is performed by a decapsulation chain associated with the first interface and with the first protocol;

computer readable program code means for passing, upon completion of processing by the decapsulation chain, the packet to and processing it in an encapsulation chain associated with a second interface and a second protocol; and computer readable program code means for transmitting the processed packet from the second interface.

32. An article of manufacture for use in a computer network router, the article of manufacture comprising a computer usable medium having computer readable program code means embodied in the medium, said program code means of causing processing of a packet, the program code means including:

computer readable program code means embodied in said computer useable medium for causing a router to specify a chain of function elements, each element capable of performing an operation on a packet, the chain being associated with an interface and a protocol;

computer readable program code means embodied in said computer useable medium for causing a router to process the packet by walking through the elements of the chain;

computer readable program code means embodied in said computer useable medium for receiving an incoming packet at a first interface, the packet being encapsulated according to a first protocol, wherein processing of the packet is performed by a decapsulation chain associated with the first interface and with the first protocol;

computer readable program code means embodied in said computer useable medium for passing, upon completion of processing by the decapsulation chain, the packet to and processing it in an encapsulation chain associated with a second interface and a second protocol; and computer readable program code means embodied in said computer useable medium for transmitting the processed packet from the second interface.

* * * * *